United States Patent
Brillant et al.

(10) Patent No.: US 10,955,973 B2
(45) Date of Patent: Mar. 23, 2021

(54) DIFFERENTIAL SENSING FOR TOUCH SENSORS

(71) Applicant: Atmel Corporation, Chandler, AZ (US)

(72) Inventors: Gregory Brillant, Trondheim (NO); Steinar Myren, Vikhammer (NO); Terje Saether, Sor-Trondelag (NO)

(73) Assignee: Atmel Corporation, Chandler, AZ (US)

( * ) Notice: Subject to any disclaimer, the term of this patent is extended or adjusted under 35 U.S.C. 154(b) by 1004 days.

(21) Appl. No.: 13/864,058

(22) Filed: Apr. 16, 2013

(65) Prior Publication Data

US 2014/0306923 A1    Oct. 16, 2014

(51) Int. Cl.
*G06F 3/044* (2006.01)
*G06F 3/041* (2006.01)

(52) U.S. Cl.
CPC .......... *G06F 3/044* (2013.01); *G06F 3/04164* (2019.05)

(58) Field of Classification Search
CPC .......... G06F 3/044; G06F 2203/041111; G06F 2203/04112; G06F 3/0416; G06F 3/0412; G06F 3/0443; G06F 3/041662; G06F 3/04164; G06F 3/041; G06F 3/0488; G06F 3/03547; G06F 2203/04101; G06F 2203/04104; G06F 2203/04108; G06F 2203/04106; G02F 1/13338
USPC ................ 345/173, 174; 178/18.06
See application file for complete search history.

(56) References Cited

U.S. PATENT DOCUMENTS

| | | | | |
|---|---|---|---|---|
| 5,854,881 | A * | 12/1998 | Yoshida | G06F 3/0412 345/104 |
| 6,075,520 | A * | 6/2000 | Inoue | G06F 3/04166 345/173 |
| 7,663,607 | B2 | 2/2010 | Hotelling | |
| 7,875,814 | B2 | 1/2011 | Chen | |
| 7,920,129 | B2 | 4/2011 | Hotelling | |
| 8,031,094 | B2 | 10/2011 | Hotelling | |
| 8,031,174 | B2 | 10/2011 | Hamblin | |
| 8,040,326 | B2 | 10/2011 | Hotelling | |
| 8,049,732 | B2 | 11/2011 | Hotelling | |
| 8,179,381 | B2 | 5/2012 | Frey | |
| 8,570,289 | B2 * | 10/2013 | Chang | G01R 27/2605 345/173 |
| 8,994,692 | B2 * | 3/2015 | Yumoto | G06F 3/0418 345/174 |

(Continued)

FOREIGN PATENT DOCUMENTS

WO    WO 2012/129247    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

*Primary Examiner* — Dismery Mercedes
(74) *Attorney, Agent, or Firm* — TraskBritt (57) ABSTRACT

In one embodiment, a method includes outputting a first current associated with a first electrode track of a self-capacitance touch sensor. The method also includes outputting a second current associated with a second electrode track of the self-capacitance touch sensor. The method also includes measuring a voltage associated with a difference between the first and second currents and determining a position of an object relative to the self-capacitance touch sensor based on the voltage.

19 Claims, 5 Drawing Sheets

(56) References Cited

U.S. PATENT DOCUMENTS

| | | | |
|---|---|---|---|
| 9,013,444 B2* | 4/2015 | Hanssen | G06F 3/0443 345/174 |
| 9,110,544 B2* | 8/2015 | Chang | G06F 3/0446 |
| 9,285,902 B1* | 3/2016 | Kremin | G06F 3/044 |
| 9,501,180 B2* | 11/2016 | Hung | G06F 3/0446 |
| 2003/0080755 A1* | 5/2003 | Kobayashi | G01D 5/2405 324/658 |
| 2005/0122785 A1* | 6/2005 | Umeda | G06K 9/0002 365/187 |
| 2006/0227119 A1* | 10/2006 | Hsieh | G06F 3/044 345/173 |
| 2006/0250142 A1* | 11/2006 | Abe | H03K 17/955 324/663 |
| 2007/0076171 A1* | 4/2007 | Fasen | H04N 5/74 353/30 |
| 2008/0252474 A1* | 10/2008 | Nakamura | H03K 17/955 340/657 |
| 2009/0212642 A1* | 8/2009 | Krah | G06F 1/3203 307/109 |
| 2009/0315854 A1 | 12/2009 | Matsuo | |
| 2010/0045310 A1* | 2/2010 | Betancourt | G06F 3/044 324/686 |
| 2010/0181180 A1 | 7/2010 | Peter | |
| 2010/0315102 A1* | 12/2010 | Portmann | G06F 3/0416 324/680 |
| 2011/0037708 A1* | 2/2011 | Yang | G06F 3/0446 345/173 |
| 2011/0048812 A1* | 3/2011 | Yilmaz | G06F 3/044 178/18.06 |
| 2011/0084929 A1* | 4/2011 | Chang | G06F 3/0416 345/173 |
| 2011/0090212 A1* | 4/2011 | Han | G09G 3/3696 345/212 |
| 2011/0163994 A1* | 7/2011 | Tang | G06F 3/044 345/174 |
| 2012/0038573 A1* | 2/2012 | Kuang | G06F 3/0418 345/173 |
| 2012/0050211 A1* | 3/2012 | King | G06F 3/0446 345/174 |
| 2012/0120006 A1* | 5/2012 | Liu | G06F 3/044 345/173 |
| 2012/0133594 A1* | 5/2012 | Edwards | G06F 3/04166 345/173 |
| 2012/0169631 A1* | 7/2012 | Ahn | G06F 3/044 345/173 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2012/0299869 A1* | 11/2012 | Hung | G06F 3/044 345/174 |
| 2012/0306802 A1* | 12/2012 | McCracken | G06F 3/044 345/174 |
| 2012/0327026 A1* | 12/2012 | Lee | G06F 3/041 345/174 |
| 2013/0082763 A1* | 4/2013 | Inada | G01L 1/146 327/517 |
| 2013/0093720 A1* | 4/2013 | Liu | G06F 3/04184 345/174 |
| 2013/0257785 A1* | 10/2013 | Brown | G06F 3/044 345/174 |
| 2013/0278538 A1* | 10/2013 | Brunet et al. | 345/174 |
| 2013/0314109 A1* | 11/2013 | Kremin | G01R 27/2605 324/686 |
| 2014/0043279 A1* | 2/2014 | Pedersen | G06F 3/0416 345/174 |
| 2014/0104261 A1* | 4/2014 | Cheng | G09G 3/3696 345/212 |
| 2014/0152621 A1* | 6/2014 | Okayama | G06F 3/0416 345/174 |
| 2014/0168159 A1* | 6/2014 | Li | G06F 3/0416 345/174 |
| 2014/0210764 A1* | 7/2014 | Shepelev | G06F 3/044 345/174 |
| 2014/0253491 A1* | 9/2014 | Kwon, II | G06F 3/044 345/174 |
| 2014/0306924 A1* | 10/2014 | Lin | G06F 3/04166 345/174 |
| 2015/0301646 A1* | 10/2015 | Caldwell | G06F 3/0412 345/174 |
| 2016/0003663 A1 | 1/2016 | Miatton et al. | |

* cited by examiner

DIFFERENTIAL SENSING FOR TOUCH SENSORS

TECHNICAL FIELD

This disclosure relates generally to touch sensor technology.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), Smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, in particular embodiments. When an object touches or comes within proximity of the surface of the capacitive touch screen, a change in capacitance may occur within the touch screen at the location of the touch or proximity. A touch-sensor controller may process the change in capacitance to determine its position on the touch screen.

DETAILED DESCRIPTION

Figure 1:
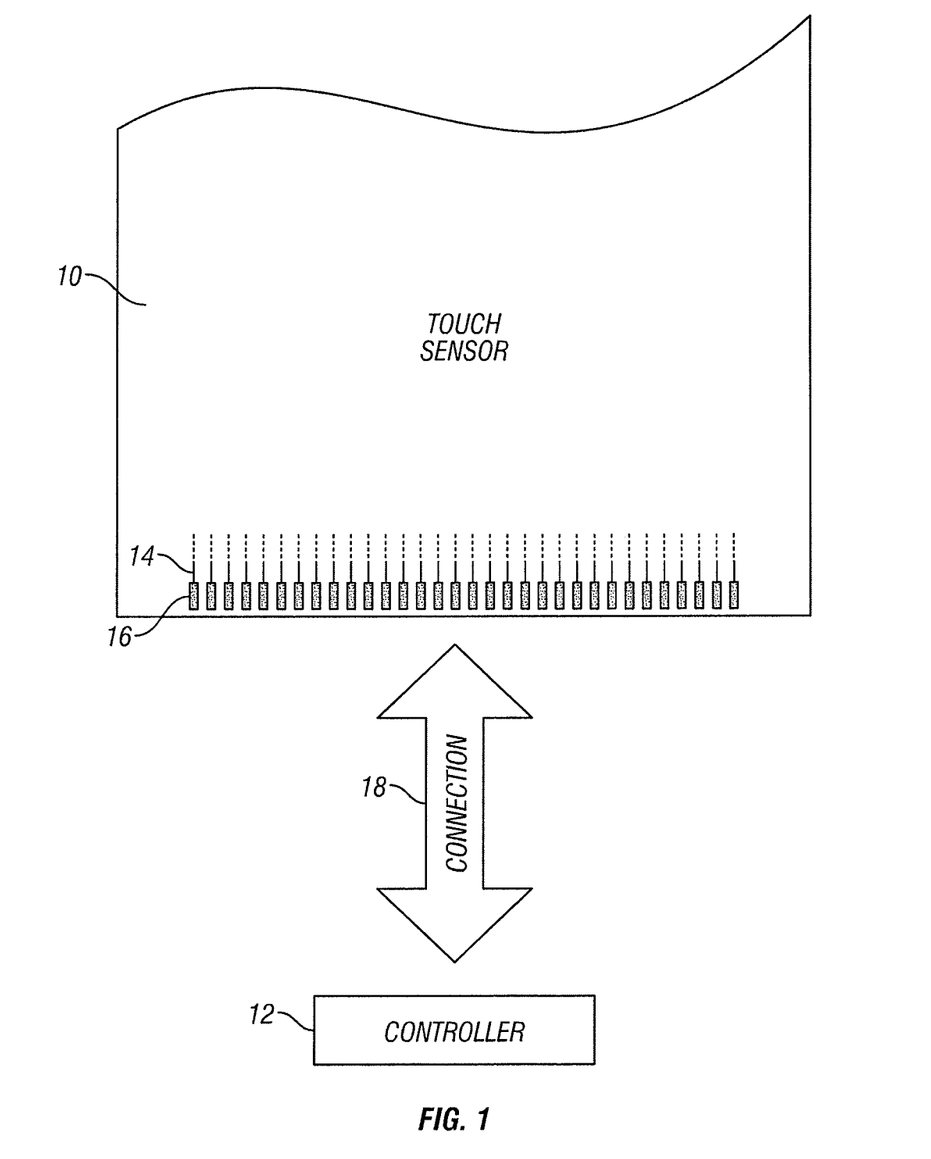
FIG. 1 illustrates an example touch sensor and controller.

FIG. 1 illustrates example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, in particular embodiments. Similarly, reference to a touch-sensor controller may encompass both the touch-sensor controller and its touch sensor, in particular embodiments. Touch sensor 10 may include one or more touch-sensitive areas, in particular embodiments. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, in particular embodiments. Alternatively, in particular embodiments, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), in particular embodiments. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material; and the fine lines of conductive material may occupy approximately 5% of the area of its shape in a hatched, mesh, or other suitable pattern. Herein, reference to FLM may encompass such material, in particular embodiments. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

In particular embodiments, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, in particular embodiments, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, in particular embodiments.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, in particular embodiments. Similarly, reference to a sense line may encompass one or more sense electrodes making up the sense line, and vice versa, in particular embodiments.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, in particular embodiments. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, in particular embodiments. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g., at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Touch sensor 10 may interact with a touch object such as an active stylus in any suitable manner. A particular active stylus may be configured to cause a change in capacitance at a capacitive node of touch sensor 10. The change in capacitance induced by the active stylus may mimic a touch by, for example, a human finger. Accordingly, when the processor causes the drive unit to supply drive signals to the one or more of the drive electrodes, an active stylus may detect the pulse and respond by injecting a charge at a capacitive node in proximity to the active stylus. The touch-sensor controller 12 may measure the change in capacitance to detect and/or track the location of the active stylus.

Figure 2A:
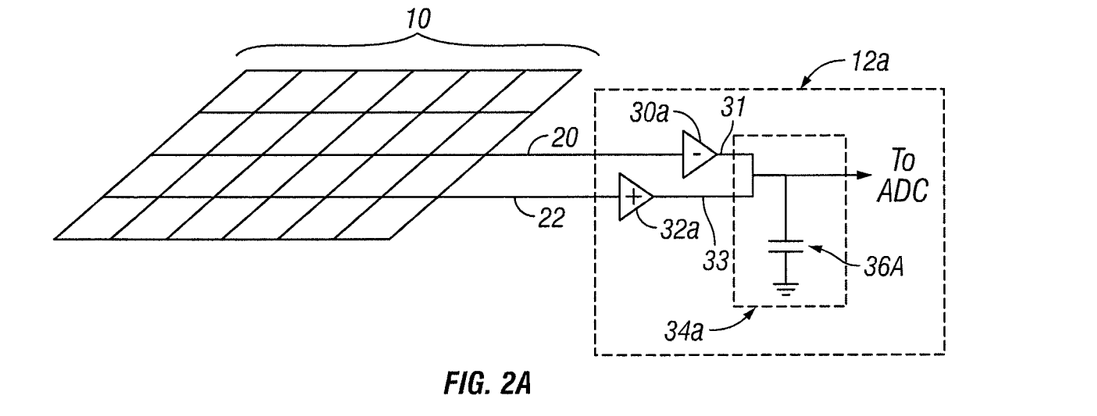
FIG. 2A illustrates example circuitry that may be used in the touch sensor and controller of FIG. 1.
Figure 2B:
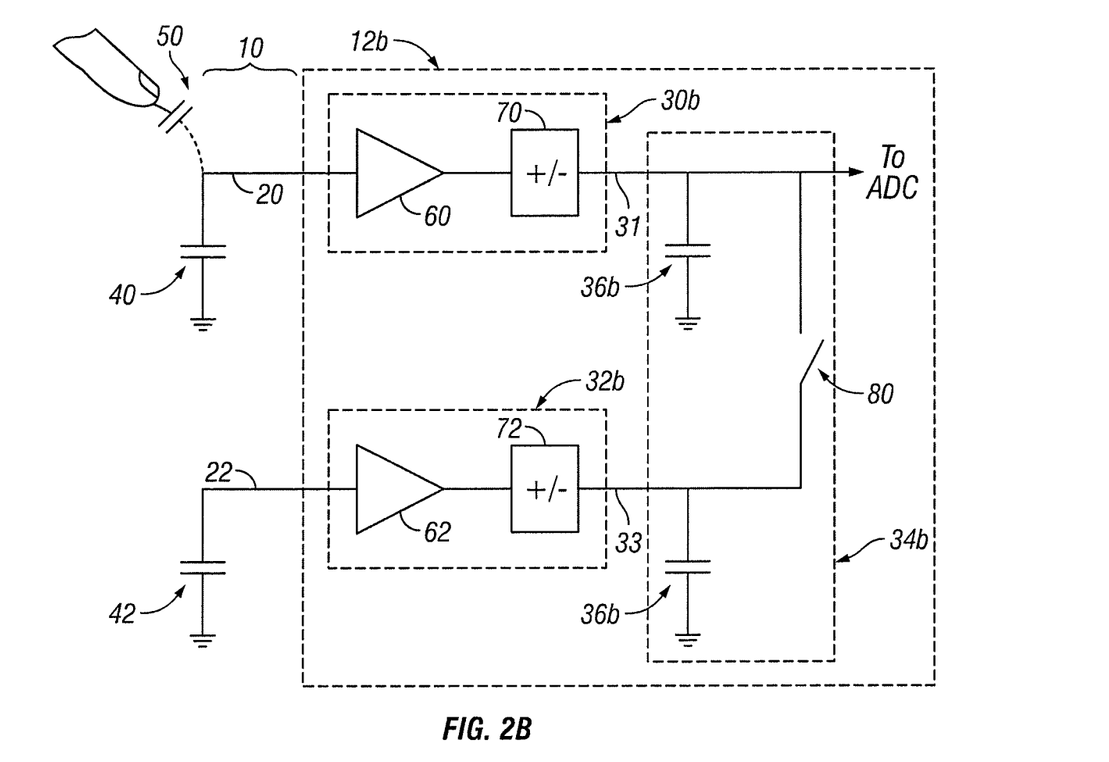
FIG. 2B illustrates another example of circuitry that may be used in the touch sensor and controller of FIG. 1.

FIGS. 2A and 2B illustrate example touch sensors that use differential sensing. In particular embodiments of touch sensor 10, touch sensor 10 may be configured to determine a location of a touch and/or the proximity of an object using differential measurements. Two circuits may have a predetermined quiescent voltage at their inputs. A first electrode track of the touch sensor may be connected to the input of the first circuit, and a second electrode track of the touch sensor may be connected to the input of the second circuit, causing current to flow from the circuits to their respective electrode tracks until the inputs return to their quiescent voltage. In response to these input currents, the circuits may generate output currents, and a touch-sensor controller may determine a location of a touch and/or the proximity of the object by measuring a differential value associated with these currents. For example, the first and second circuits may have opposite polarities, such that the output currents flow in opposite directions along a third circuit connecting the outputs of the first and second circuits. The third circuit may include a capacitor, and a voltage associated with the capacitor may indicate a difference in the magnitude of the output currents. Because (1) the voltage of the third circuit indicates a difference between the magnitudes of the output currents, (2) the magnitudes of the output currents are proportional to the input currents, and (3) the magnitudes of the input currents are affected by capacitive coupling of an object (e.g., a finger or a stylus) with the two electrode tracks, measuring the voltage associated with the third circuit may enable the determination of a position of the object relative to the touch sensor.

Using these types of differential measurements in a touch-sensor may result in various technical advantages. One technical advantage may be the ability to provide a touch sensor that is capable of detecting the location of a touch object using differential measurements. Furthermore, in self-capacitance touch sensors, measurement of a single track in isolation may be affected by parasitic capacitance, and the differential measurements discussed herein may reduce or remove these parasitic capacitance effects. As another example of a technical advantage, the sensitivity of the touch sensor may be increased by enabling the detecting of smaller capacitance changes. As yet another example, various embodiments described herein may enable the use of higher gains in amplifiers associated with electrode tracks without exceeding the measurement limits of downstream measurement circuitry. Differential measurements may also provide an improved signal to noise ratio.

FIG. 2A illustrates example touch sensor 10 and a portion of example touch-sensor controller 12a that uses differential sensing. As depicted, touch sensor 10 includes tracks 20 and 22, and touch-sensor controller 12a includes circuits 30a, 32a, and 34a. Currents moving through tracks 20 and 22 are provided to circuits 30a and 32a, respectively. In response to these currents on tracks 20 and 22, circuits 30a and 32b provide first current 31 and second current 33 as outputs. A differential measurement associated with a difference between the first and second currents may be used to determine a position of an object relative to touch sensor 10. Although touch sensor 10 may include any appropriate number and combination of tracks 14, for ease of illustration, FIG. 2A illustrates the architecture associated with two particular electrode tracks, 20 and 22. Similarly, while touch-sensor controller 12 may include any appropriate number and combination of circuits connected to touch sensor 10, for ease of illustration, FIG. 2A illustrates the particular architecture of circuits 30a, 32a, and 34a.

Tracks 20 and 22 represent two example tracks 14 from FIG. 1. Tracks 20 and 22 may include any structure or component discussed above with respect to tracks 14. Tracks 20 and 22 may be adjacent tracks or nonadjacent tracks. Furthermore, tracks 20 and 22 may be parallel tracks or non-parallel tracks. During operation, a voltage may be applied to track 20, causing current to travel along track 20 to circuit 30a. For example, track 20 may be connected to the input of circuit 30a (e.g., by closing a switch), which may cause current to flow through track 20. The presence of a conductive object, such as a finger or a stylus, near track 20 may lead to capacitive coupling between the object that track, which may affect the amount of current flowing through track 20. Track 22, which may be connected to circuit 32a, may operate in an analogous manner. Tracks 20 and 22 may be driven to the same voltage, such as, for example, Vdd/2, where Vdd is the supply voltage of a voltage supply rail associated with touch sensor 10. Furthermore, tracks 20 and 22 may be driven at the same time or close to the same time. When touch sensor 10 is not in contact with or near the conductive object, driving tracks 20 and 22 to the same voltage may result in the same or similar currents flowing through tracks 20 and 22. However, when touch sensor 10 is in contact with or near conductive object, and the object is closer to one track than the other, the tracks may experience asymmetric capacitive coupling with the object, which may result in different currents flowing through the tracks.

In some embodiments, parallel tracks 14 may be driven in the same direction, which may increase the strength of the sensed signal. Furthermore, in certain embodiments, when signals associated with tracks 20 and 22 are being measured, other unmeasured tracks 14 may also be driven at the same time. Operating touch sensor 10 in this manner may remove or reduce parasitic capacitance effects. Operating touch sensor 10 in this manner may also increase the strength of the electric field interacting with the finger, stylus, or other conductive object.

In the illustrated embodiment, touch-sensor controller 12a includes circuits 30a, 32a, and 34a. Inputs of circuits 30a and 32a may be connected to tracks 20 and 22, respectively. Outputs of circuits 30a and 32a may be connected to circuit 34a, which is connected to additional components of touch-sensor controller 12a. Circuit 30a generates a first current 31 in response to current moving through track 20, and circuit 32a generates a second current 33 in response to current moving through track 22. Currents 31 and 33 move in opposite directions along circuit 34a. Measuring a voltage associated with circuit 34a may provide a differential measurement of currents 31 and 33, which may indicate a position of an object relative to touch sensor 10.

Circuits 30a and 32a represent any suitable circuitry for generating a current in response to a current on tracks 20 and 22, respectively. Circuits 30a and 32a may include any suitable combination of amplifiers, sign-switching circuits, tracks of conductive material such as those described above in reference to tracks 14, or any other suitable component for outputting a current and/or generating an output current having an opposite sign from an input current. In the illustrated embodiment, circuits 30a and 32a have opposite polarities, such that identical currents moving through tracks 20 and 22 would cause circuits 30a and 32a to output currents having opposite signs. For example, in response to a positive current at the inputs of circuits 30a and 32a, circuit 30a may output a negative current while circuit 32a outputs a positive current. The magnitudes (i.e., the absolute value of the amplitudes) of currents 31 and 33 are proportional to the magnitudes of the currents received from tracks 20 and 22, respectively, though circuits 30a and 32a may amplify the magnitude of the current. Thus, a difference in the magnitudes of the currents output by circuits 30a and 32a is indicative of a difference in the magnitudes of the currents received from tracks 20 and 22. Furthermore, the build up of charge over time on capacitor 36a, as described below, in conjunction with the currents output by circuits 30a and 32a may allow circuits 30a, 32a, and 34a to act collectively as an integrator. As such, circuits 30a and 32a may act as integrators with opposite polarities. In some embodiments, the polarities of the outputs of circuits 30a and 32a are fixed. For example, a current copy branch may be added to an amplifier of circuit 30a to produce a current at the output that has an opposite sign of the current at the input. In other embodiments, the polarities of the outputs of circuits 30a and 32a are configurable by touch-sensor controller 12.

In some embodiments, circuits 30a and 32a act as amplifiers. In such embodiments, circuits 30 (collective reference to circuits 30a and 30b) and 32 (collective reference to circuits 32a and 32b) may have respective gains such that the amplitude of the output current is approximately equal to the amplitude of the input current multiplied by the gain value. In some embodiments, this gain is adjustable and may be controlled by one or more components of touch-sensor controller 12. Furthermore, the gain of either circuit 30a or 32a may effectively be set to a negative value, such that this circuit would operate as an inverting amplifier. In such embodiments, configuring one amplifier as an inverting amplifier may enable the output of opposing currents 31 and 33, as described above.

In the illustrated embodiment, circuit 34a is connected to the outputs of circuits 30a and 32a and to an analog-to-digital converter ("ADC") (not shown). Circuit 34a represents any suitable circuitry capable of receiving currents output by circuits 30a and 32a to facilitate differential measurements. As depicted, circuit 34a includes capacitor 36a, which represents any suitable circuitry operable to store energy in an electrical circuit. For example, capacitor 36a may be an inherent capacitor, polarized capacitor, non-polarized capacitor, fixed capacitor, variable capacitor, or any suitable type of capacitor. An electrical quantity associated with circuit 34a and proportional to a difference between currents 31 and 33 may be measured. For example, the measurement may be a voltage, a current, or any other suitable quantity proportional to the different between currents 31 and 33.

In operation, the currents generated by circuits 30a and 32a move in opposing directions through a portion of circuit 34a, so a charge associated with the difference between the magnitudes of these currents accumulates on capacitor 36a. For example, when circuit 30a outputs a current that operates to increase charge stored by capacitor 36a, circuit 32a may output a current that operates to decrease charge stored by capacitor 36a. The voltage associated with capacitor 36a therefore indicates a difference between the currents generated by circuits 30a and 32a. Because the difference between the currents output by circuits 30a and 32a may be indicative of differential capacitive effects on the current moving through tracks 20 and 22 caused by a nearby conductive object, measuring a voltage associated with a difference between the currents output by circuits 30a and 32a may enable touch-sensor controller 12 to determine a position of the object relative to tracks 20 and 22. Performing similar operations with other pairs of tracks 14, touch-sensor controller 12 may allow touch-sensor controller 12 to more precisely determine a position of the object relative to touch sensor 10. Furthermore, because the currents generated by circuits 30 and 32 flow move in opposition to one another through circuit 34 (collective reference to circuits 34a and 34b), the voltage stored by capacitor 36a as a result of voltage applied to tracks 20 and 22 may be smaller than it would be if tracks 20 and 22 were sensed individually. In embodiments where voltage-measurement circuitry of touch-sensor controller 12 has a limited measurement range, coupling two electrode tracks in this manner to facilitate a single voltage measurement that captures the difference between their currents may enable greater measurement sensitivity. For example, circuits 30 and 32 may be able to increase their amplification of the touch sensor signals without "railing" the system, which may occur when the measurement range of the downstream measurement circuitry is exceeded. Analogous technical advantages may be provided in other embodiments utilizing different types of measurement circuitry (e.g., current-measuring circuitry).

FIG. 2B illustrates example touch sensor 10 and a portion of another example touch-sensor controller 12b that uses differential sensing. As depicted, touch sensor 10 includes tracks 20 and 22, and touch-sensor controller 12 includes circuits 30b, 32b, and 34b. Tracks 20 and 22 may be connected to the inputs of circuits 30b and 32b, respectively. In response to currents on tracks 20 and 22, circuits 30b and 32b output first and second currents 31 and 33, respectively. A differential measurement associated with a difference between the first and second currents may be used to determine a position of an object relative to touch sensor 10.

Tracks 20 and 22 represent two example tracks 14 from FIG. 1. The structure, configuration, and operation of tracks 20 and 22 in the example embodiment of FIG. 2B is the same as discussed above in reference to FIG. 2A.

Capacitors 40 and 42 represent the inherent capacitance of tracks 20 and 22, respectively, or components thereof. For example, one or more components of track 20 may have a capacitance determined by the composition and configuration of track 20 and/or the composition and configuration of the surrounding components. Capacitor 40 represents this inherent capacitance. When an object, such as a finger or a stylus, is near track 20, this capacitance may be affected by capacitive coupling (e.g., capacitive coupling 50) between the object and track 20. Similarly, one or more components of track 22 may have a capacitance determined by the composition and configuration of track 22 and the composition and configuration of the surrounding components. Capacitor 42 represents this inherent capacitance. When an object, such as a finger or a stylus, is near track 22, this capacitance may be affected by capacitive coupling between the object and track 22.

Capacitive coupling 50 represents capacitive coupling that may occur between an object and a portion of touch sensor 10. In the illustrated embodiment, the object coupling with track 20 is a user's finger, though other embodiments may utilize different objects (such as, for example, a stylus) in place of or in addition to a finger. The presence of this finger during a sensing sequence of touch sensor 10 may result in capacitive coupling 50 between the finger and track 20, which may change the amount of current needed to drive track 20 to a particular voltage. If track 22 is not affected by this type of coupling with the finger, or if it is affected to a different degree, then the resulting difference between the currents flowing through tracks 20 and 22 (assuming that tracks 20 and 22 are driven to the same voltage) will result in a different magnitudes of current being output by circuits 30b and 32b.

In the illustrated embodiment, circuit 30b includes amplifier 60 and sign-switching circuit 70. Similarly, circuit 32b includes amplifier 62 and sign-switching circuit 72. Circuits 30b and 32b are operative to perform the same functions described above in reference to 30a and 32a, respectively.

Amplifiers 60 and 62 may include any appropriate buffer, amplifier, other component, or combination thereof that is operable to amplify a signal sensed on tracks 20 and 22, respectively. The inputs of amplifiers 60 and 62 may be low impedance inputs. Inputs of amplifiers 60 and 62 are connected to tracks 20 and 22, respectively, and are operative to amplify a signal received at their respective inputs. For example, in response to a current on track 20, amplifier 60 outputs an amplified signal that may be proportional to the input signal. Amplifiers 60 and 62 may have respective gains such that the amplitude of the output current is approximately equal to the amplitude of the input current multiplied by the gain value. In some embodiments, the gain of amplifiers 60 and 62 is adjustable, similar to the adjustable gain described above with respect to circuits 30a and 32a.

Sign-switching circuits 70 and 72 represent any appropriate component, structure, or combination thereof that is capable of outputting a current having an opposite sign from current received at its input. For example, sign-switching circuits 70 or 72 may include one or more current mirrors, such as metal-oxide-semiconductor ("MOS") current mirrors. Furthermore, sign-switching circuits 70 and 72 may be distinct components from amplifiers 60 and 62, or they may be integrated with amplifiers 60 and 62. As a particular example, and not by way of limitation, copying a current from a negative-channel MOS ("nMOS") current source to a positive-channel MOS ("pMOS") current source, the polarity of the current changes. Thus, in response to a positive current received at its input from amplifier 60, sign-switching circuit 70 may generate a negative current at its output, effectively reversing the polarity at the output. Sign-switching circuits 70 and 72 may be configurable to reverse polarity under certain conditions. For example, another component of touch-sensor controller 12 may control the operation of sign-switching circuits 70 and 72. Sign-switching circuits 70 and 72 enables the generation of opposing currents along circuit 34b in response to signals from tracks 20 and 22 that have the same direction. This may allow differential measurements to be taken from a single measurement by rather than two separate measurements.

The opposing currents generated by sign-switching circuits 70 and 72 result in a build up of charge on the capacitors of circuit 34b that is associated with a difference between the magnitudes of these currents. This differential current may be detected by measuring the voltage of circuit 34b following the drive sequence of tracks 20 and 22.

In the illustrated embodiment, circuit 34b includes capacitors 36b and switch 80. Capacitors 36b may include any component or configuration discussed above in reference to capacitor 36a. In some embodiments, capacitors 36b may include discrete or explicit capacitors, while capacitors 40 and 42 may represent the inherent capacitance of the components of electrode tracks 20 and 22. Utilizing multiple capacitors, as opposed to the single capacitor 36a depicted in the embodiment of FIG. 2A, may enable even larger amplification by amplifiers 60. Since the accumulated charge associated with the differential currents can effectively be shared between capacitors 36b, greater amounts of current may be output by circuits 30b and 32b without exceeding the measurement limits of touch-sensor controller 12b. Enabling greater signal amplification in this manner may allow smaller capacitive effects to be detected, which may improve the sensitivity of touch sensor 10.

Switch 80 is operable to connect or disconnect circuitry associated with track 20 from circuitry associated with track 22. Switch 80 represents any appropriate form of mechanical and/or electrical switching device operable to conduct current in the on position and/or form an open circuit in the off position. For example, switch 80 may be any appropriate form of transistor device, including field effect transistors (FETS). In some embodiments, switch 80 may be implemented using metal-oxide-semiconductor FETS (MOSFETS), such as NMOS or PMOS transistors. The gates of switch 80 may be controlled via one or more control signals transmitted from touch-sensor controller 12. Touch-sensor controller 12 may include any number and configuration of switches 80, which may enable touch-sensor controller 12 to connect various electrode tracks to perform differential sensing between any two electrode tracks 14.

Figure 3:
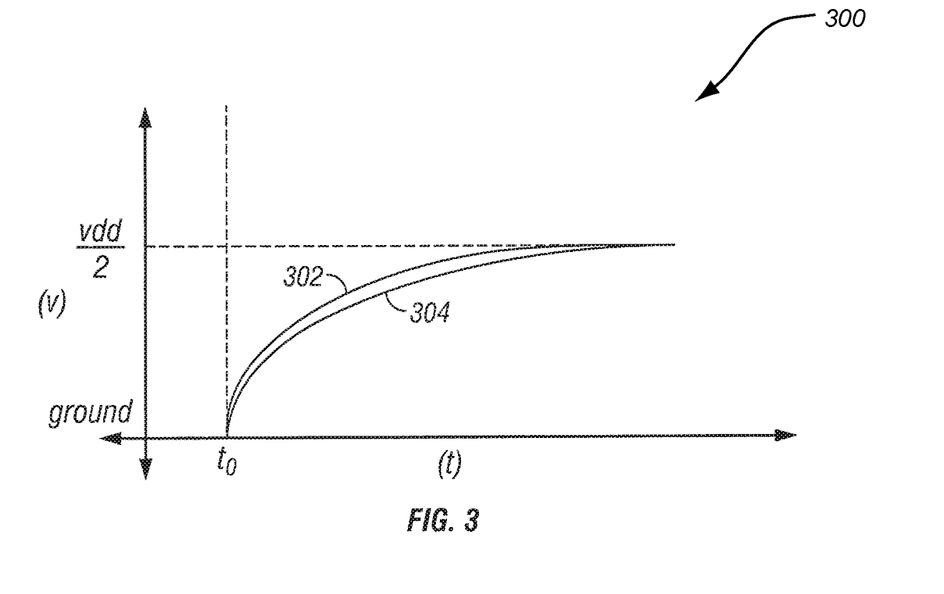
FIG. 3 illustrates a graph of example voltage that may be applied to portions of the circuitry of FIGS. 2A and 2B.

FIG. 3 illustrates a graph of example voltage associated with the input of circuit 30a, 30b (sometimes collectively referred to as "circuit 30"), or 32a, 32b (sometimes collectively referred to as "circuit 32") of FIGS. 2A and 2B. Graph 300 includes voltages 302 and 304. Voltage 302 represents voltage associated with the input of circuit 30 or 32 when a conductive object is not capacitively coupled with the associated track (e.g., track 20 or 22). Voltage 304 represents voltage associated with the input of circuit 30 or 32 when an object is capacitively coupled with the associated track (e.g., track 20 or 22). Voltages 302 and 304 begin increasing when the input of circuit 30 or 32 is connected to the associated track at time to. Connecting the associated track (e.g., track 20 or 22) to the input of circuit 30 or 32 may cause current to flow through the associated track until the input reaches a predetermined value, such as Vdd/2. In some embodiments, the input of circuit 30 or 32 may be driven from a voltage other than ground at time to and may be driven to a voltage other than Vdd/2. For example, the input of circuit 30 or 32 may be driven from a reference voltage between ground and Vdd/2. As another example, the input of circuit 30 or 32 may be driven to Vdd or voltage between Vdd and Vdd/2. When the object is capacitively coupled with track 20, a different amount of current may be required to drive the input to Vdd/2, as indicated by the difference in voltages 302 and 304 over time. This difference in voltage and the corresponding current on the associated track when an object is capacitively coupled with the associated track results in a different amount of current output by circuit 30.

Figure 4:
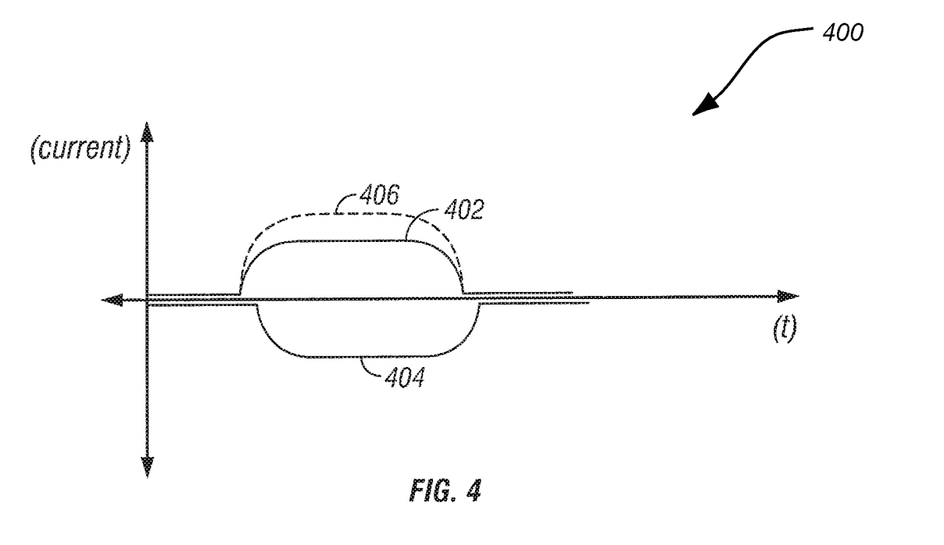
FIG. 4 illustrates a graph of example currents that may be generated by portions of the circuitry of FIGS. 2A and 2B.

FIG. 4 illustrates a graph of example currents that may be generated at the outputs of circuits 30 and 32 of FIGS. 2A and 2B. Graph 400 depicts currents 402, 404, and 406. Currents 402 and 404 represents currents output by circuits 30 and 32, respectively, when tracks 20 and 22 and are not differently affected by capacitive coupling of a nearby object. Currents 402 and 404 have approximately the same magnitude and opposite values, as explained above. In some embodiments, different delays during the process of applying voltage to tracks 20 and 22 and outputting current by circuits 30 and 32 may result in one current being delayed relative to the other, as illustrated by the slight delay of current 404 behind current 402. Current 406 represents a current that may be output by circuit 30 when an object is capacitively coupled to track 20. In the depicted example, the capacitive coupling of the object with track 20 results in an increased current output by circuit 30 relative to current 402, though in other embodiments current 406 may be reduced relative to 402. The resulting asymmetric current between circuits 30 and 32 may result in detectable build-up of charge on the one or more capacitors of circuit 34, which may be measured and analyzed by one or more components of touch-sensor controller 12 to determine a position of the object relative to touch sensor 10.

Figure 5:
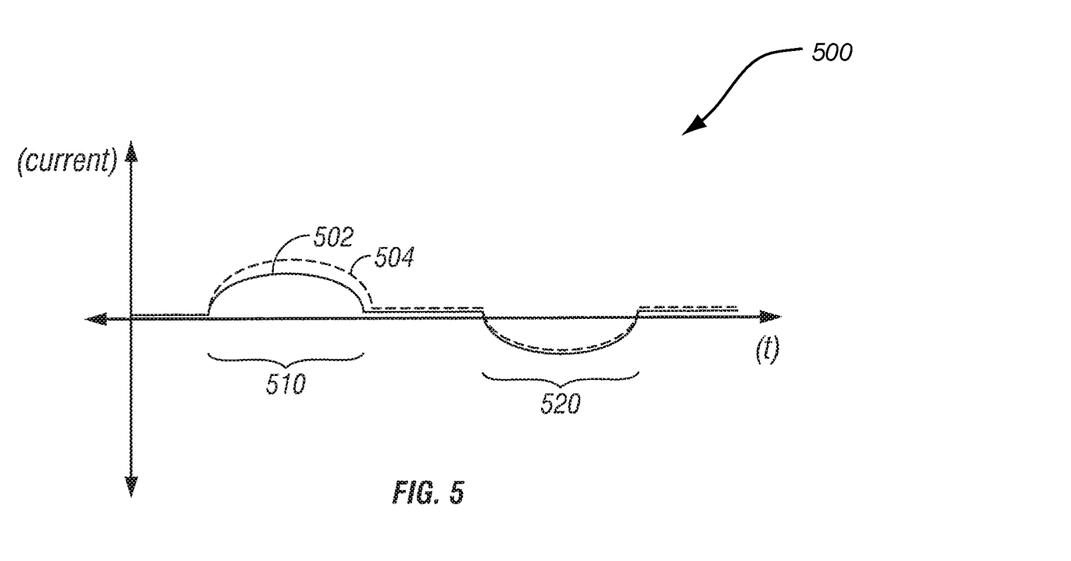
FIG. 5 illustrates a graph of example current that may flow through portions of the circuitry of FIGS. 2A and 2B.

FIG. 5 illustrates a graph of example differential current that may flow through circuit 34 of FIGS. 2A and 2B. Graph 500 includes currents 502 and 504, each of which include portions 510 and 520. Current 502 represents the differential current flowing through circuit 34 during a sensing sequence when asymmetric capacitive coupling with an object is not occurring.

Current 504 represents the differential current flowing through circuit 34 during a sensing sequence when asymmetric capacitive coupling with an object is occurring. Portions 510 and 520 represent current flowing through circuit 34a as a result of circuits 30 and 32, respectively. For example, portion 510 may represent current flowing into circuit 34 as a result of first current 31, and portion 520 may represent current flowing out of circuit 34 as a result of second current 33. Current 504 has a different magnitude from current 502 within portion 510 due to the different magnitude of first current 31 when the object is capacitively coupled with track 20 (as shown, for example, by currents 402 and 406 in FIG. 4). In some embodiments, even when voltage is applied to tracks 20 and 22 at the same time, various non-ideal effects may cause currents 31 and 33 to be output at different times. This potential current delay is represented by the separation in time of portions 510 and 520. In other embodiments, this delay may be reduced or eliminated.

Figure 6:
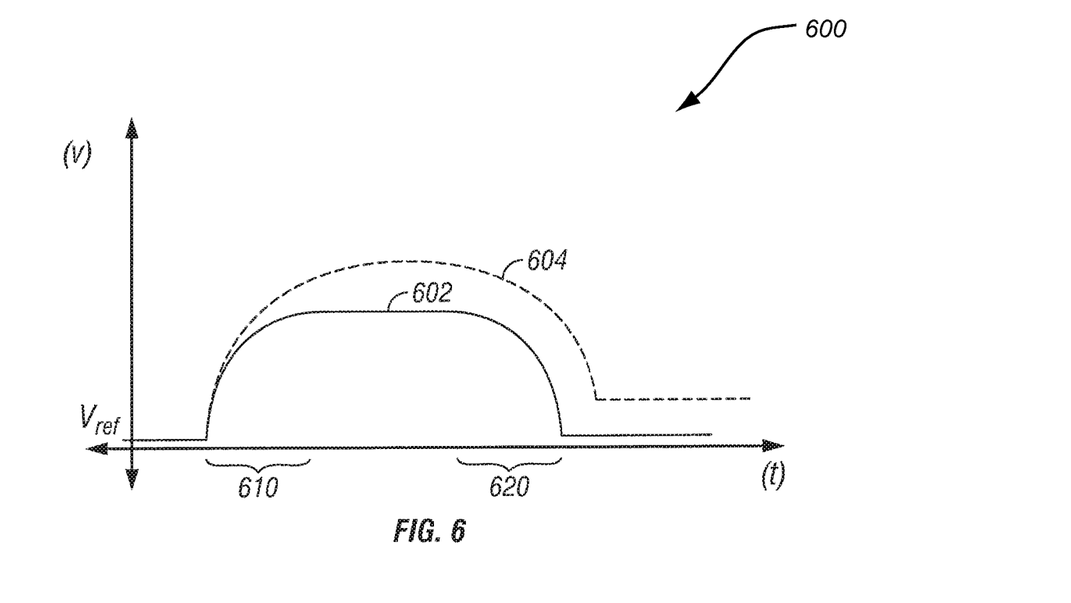
FIG. 6 illustrates a graph of example voltage that may be measured in portions of the circuitry of FIGS. 2A and 2B.

FIG. 6 illustrates a graph of example voltage that may be measured from circuit 34 of FIGS. 2A and 2B. Graph 600 includes voltages 602 and 604. Voltage 602 represents the voltage that may be present on circuit 34 when asymmetric capacitive coupling with an object is not occurring. Voltage 604 represents the voltage that may be present on circuit 34 when asymmetric capacitive coupling with an object is occurring. For example, voltage 602 may result from the buildup of charge caused by current 502 of FIG. 5, while voltage 604 may result from the buildup of charge caused by current 504 of FIG. 5. Voltage 602 begins at a reference voltage level ("Vref"), rises during rise time 610, falls during fall time 620, and returns approximately to Vref because the oppositional currents output by circuits 30 and 32 (e.g., currents 31 and 33, respectively) are approximately equal in magnitude and opposite in direction, effectively cancelling each other out. Vref may be any voltage between ground and Vdd. For example, Vref may be Vdd/2. Voltage 604 does not return approximately to Vref because the differential influence of the object with tracks 20 and 22 results in currents with different magnitudes and opposite signs being output by circuits 30 and 32, which causes a net change in charge stored by circuit 34. The voltage present on circuit 34 at the end of the driving sequence may thus be measured and analyzed by one or more components of touch-sensor controller 12 to determine a position of the object relative to tracks 20 and 22.

The value of the voltage associated with circuit 34 (i.e., voltage 604 or 602) may be processed by additional circuitry of touch-sensor controller 12, such as an ADC. For example, touch-sensor controller 12 may perform integration of the voltage values to reconstruct the differential current flowing into circuit 34. Touch-sensor controller 12 may analyze the voltage and/or the reconstructed differential currents to determine a position of an object relative to touch sensor 10. For example, in touch-sensor controller 12b where tracks 20 and 22 have capacitance values of "Cext1" and "Cext2," respectively; capacitors 36b have a capacitance of "Cint1" and "Cint2," respectively; the inputs of circuits 30 and 32 are driven to voltage "V;" track 20 experiences capacitive coupling 50 of the amount "Ct;" and amplifiers 60 and 70 have a current gain value of "Ai;" the voltage "Vint" of circuit 34 after a sensing sequence may be interpreted using the following formula:

$$V\text{int} = \frac{A * V * (C\text{ext2} - C\text{ext1} + Ct)}{C\text{int1} + C\text{int2}}$$

Where Cext1 is equal to Cext2 and Cint1 is equal to Cint2, Vint may be interpreted as follows:

$$V\text{int} = \frac{A * V * Ct}{C\text{int1}}$$

Thus, Ct may be determined by analyzing Vint. The value of Ct may be analyzed to determine a position of the object relative to tracks 20 and 22. Performing similar operations with additional tracks 14 may enable touch-sensor controller 12 to determine a more precise position of the object with respect to touch sensor 10. In some embodiments, this analysis may also enable the detection of an object near but not in contact with touch sensor 10, which may be identified as a "hover."

Figure 7:
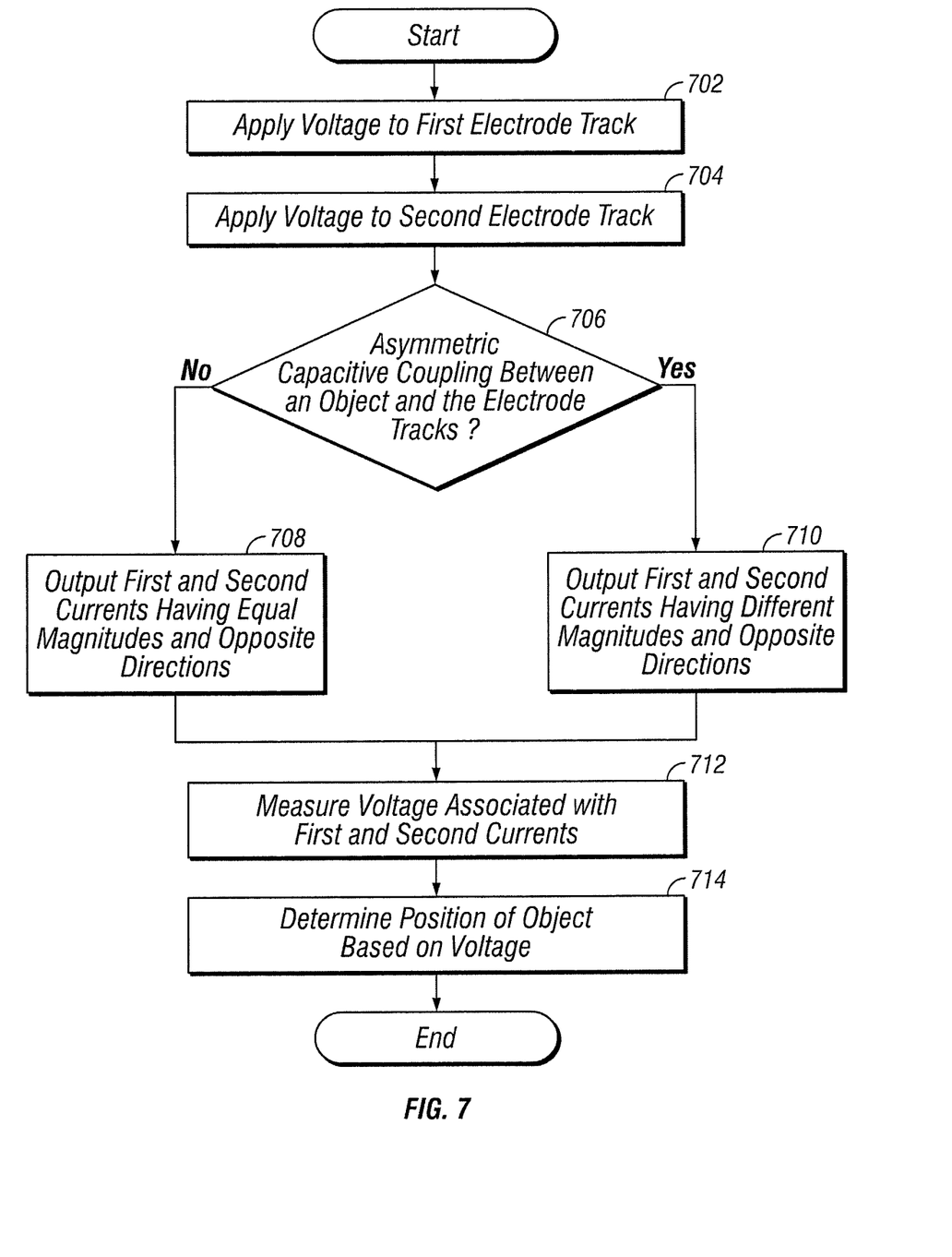
FIG. 7 illustrates an example method of operating a touch sensor using differential sensing that may be used in the touch sensor and controller of FIGS. 2A and 2B.

FIG. 7 illustrates an example method of operating touch sensor 10 using differential sensing. Particular embodiments may repeat the steps of FIG. 7, where appropriate. For example, these steps may be performed on different pairs of tracks 14 in succession. Moreover, although this disclosure describes and illustrates particular steps in FIG. 7 as occurring in a particular order, this disclosure contemplates any suitable steps in FIG. 7 occurring in any suitable order. For example, the order of steps 702 and 704 may be switched. Furthermore, the steps of FIG. 7 may be performed at different times during the operation of touch sensor 10.

In some embodiments, these steps are carried out using one or more components of FIGS. 1, 2A, and 2B. Furthermore, although this disclosure describes and illustrates particular components, devices, or systems carrying out particular steps in FIG. 7, this disclosure contemplates any suitable combination of any suitable components, devices, or systems carrying out any suitable steps in FIG. 7.

At step 702, voltage is applied to a first electrode track (e.g., electrode track 20) of a touch sensor, such as touch sensor 10. For example, track 20 may be connected to the input of circuit 30a or 30b (e.g., by closing a switch), causing current to flow through track 20, until the input of circuit 30a or 30b reaches a predetermined value, such as Vdd/2. When the object is capacitively coupled with track 20, a different amount of current flowing through track 20 may be required to drive the input of circuit 30a or 30b to the predetermined value.

At step 704, voltage is applied to a second electrode track (e.g., electrode track 22) of a touch sensor, such as touch sensor 10. For example, track 22 may be connected to the input of circuit 32a or 32b (e.g., by closing a switch), causing current to flow through track 22, until the input of circuit 32a or 32b reaches a predetermined value, such as Vdd/2. When the object is capacitively coupled with track 22, a different amount of current flowing through track 22 may be required to drive the input of circuit 32a or 32b to the predetermined value. The inputs of circuits 30 and 32 may be driven to the same predetermined value during steps 702 and 704. Furthermore, steps 702 and 704 may occur at the same time or close to the same time.

At step 706, the first and second electrode tracks may experience asymmetric capacitive coupling with an object. When touch sensor 10 is not in contact with and is not near the object, driving the inputs of circuits 30 and 32 to the same predetermined value may result in the same or similar currents flowing through tracks 20 and 22. However, when the touch sensor is in contact with or near the object, and the object is closer to one electrode track than the other, the electrode tracks may experience asymmetric capacitive coupling with the object, which may result in different amounts of current flowing through the electrode tracks to drive the inputs of the respective circuits to the predetermined voltage (e.g., Vdd/2). If asymmetric capacitive coupling is not experienced, the sequence proceeds to step 708. If asymmetric capacitive coupling is experienced, the sequence proceeds to step 710.

At step 708, first and second currents having approximately equal magnitudes are output by the first and second circuits, respectively. The first circuit may include any component described above with respect to circuit 30a or 30b. The second circuit may include any component described above with respect to circuit 32a or 32b. As described above in step 702, the current moving through the first electrode track is received at the input of the first circuit, and the first circuit provides the first current (e.g., first current 31 of FIGS. 2A and 2B) at its output in response to this input. Similarly, as described above in step 704, the current moving through the second electrode track is received at the input of the second circuit, and the second circuit provides the second current (e.g., second current 33 of FIGS. 2A and 2B) at its output in response to this input. Furthermore, the first and second circuits are configured to output currents moving in opposite directions through a third circuit (e.g., circuit 34a or 34b) such that the net change in the amount of charge stored by the third circuit is proportional to the difference between the magnitudes of the first and second currents. Because the first and second currents have approximately equal magnitudes in step 708, the net change in charge stored by the third circuit is approximately zero. The voltage associated with the third circuit is measured in step 712.

At step 710, first and second currents having different magnitudes are output by the first and second circuits, respectively. The first circuit may include any component described above with respect to circuit 30a or 30b. The second circuit may include any component described above with respect to circuit 32a or 32b. As described above in step 702, the current moving through the first electrode track is received at the input of the first circuit, and the first circuit provides the first current at its output in response to this input. Similarly, as described above in step 704, the current moving through the second electrode track is received at the input of the second circuit, and the second circuit provides the second current at its output in response to this input. Furthermore, the first and second circuits are configured to output currents moving in opposite directions through a third circuit, such as circuit 34a or 34b, such that the net change in the amount of charge stored by the third circuit is determined by the difference between the magnitudes of the first and second currents output by the first and second circuits. Because the first and second currents have different magnitudes in step 710, there is a detectable net change in the charge stored by the third circuit. The voltage associated with the third circuit is measured in step 712.

At step 712, the voltage associated with the currents output during step 708 or 710 (i.e., the voltage associated with the third circuit) is measured. The measurement may be performed by one or more components of touch-sensor controller 12 that are not shown in FIG. 2A or 2B. In embodiments where the third circuit includes a capacitor (such as, for example, capacitors 36a), the voltage associated with the third circuit is proportional to the amount of charge stored by the capacitor during step 708 or 710. As explained above, the amount of charge stored by the capacitor is based on the difference in the magnitudes of the currents output by the first and second circuits. Since a difference in the magnitudes of the currents output by the first and second circuits is indicative of a difference in capacitive coupling experienced by the electrode tracks connected to the respective inputs of the circuits, the measured voltage is indicative of asymmetric coupling between an object, such as a finger or a stylus, and these electrode tracks. The measured voltage can therefore be used during step 714 to determine a position of the object relative to the touch sensor.

In some embodiments, step 712 may involve measuring a current (in addition to or instead of measuring the voltage) associated with the currents output during step 708 or 710. For example, in embodiments where touch-sensor controller 12 includes a high speed current mode ADC, touch-sensor controller 12 may measure an amount of current associated with circuit 34. The amount of current flowing into or out of circuit 34 during a sensing sequence, or the amount of current used to discharge circuit 34 after a sensing sequence, may indicate the difference in the magnitudes of the currents output by the first and second circuits. As explained above, this difference in the magnitudes of the currents output by the first and second circuits is indicative of a difference in capacitive coupling experienced by the electrode tracks connected to the respective inputs of the circuits. Thus, the measured current may be indicative of asymmetric coupling between an object (such as a finger or a stylus) and the associated electrode tracks, enabling the determination of the object's position relative to the touch sensor.

In embodiments where the measurement circuitry utilized during step 712 has a limited measurement range, measuring a single voltage that is based on the difference of the first and second currents may enable the use of higher gains in the first and second circuits, which may allow smaller capacitive effects to be detected. This sensing method may also remove or reduce the effects of parasitic capacitance during touch-sensing. Such measurements may also provide improved measurements with larger touch-sensors (such as, for example, touch sensors used in larger touch screens). Furthermore, such measurements may remove or reduce noise effects to the extent that both electrode tracks are subject to common noise.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, in particular embodiments. A computer-readable non-transitory storage medium or media may be volatile, non-volatile, or a combination of volatile and non-volatile, in particular embodiments.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. For example, the components depicted in FIGS. 2A and 2B may form a portion of and/or may be integrated into touch-sensor controller 12. Alternatively or in addition, such components may form a portion of and/or may be integrated into touch sensor 10. Moreover, the differential signal need not be produced by the illustrated components of circuits 30 and 32, but may be produced in any appropriate manner. Moreover, additional operations may be performed to return components of touch sensor 10 and/or touch-sensor controller 12 to their original state following the sensing operations described above. It should also be understood that the teachings of the present disclosure are applicable to a touch-sensor controller 12 that uses any manner of appropriate signal processing to process and/or condition signals received from sense lines of a touch sensor 10.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
outputting, by a first circuit electrically connected to a first electrode track of a self-capacitance touch sensor, a first current to a first output of the first circuit responsive to a first signal from the first electrode track, the first current having a first polarity;
outputting, by a second circuit electrically connected to a second electrode track of the self-capacitance touch sensor, a second current to a second output of the second circuit responsive to a second signal from the second electrode track, the second signal having a same polarity to that of the first signal, the second current having a second polarity opposite to the first polarity;
electrically connecting, by a third circuit electrically connected to the first circuit and the second circuit, the first output and the second output to a same terminal of a capacitor, the capacitor electrically connected between the first output and a reference voltage potential node, the capacitor configured to accumulate charge responsive to the first current and the second current;
measuring a voltage potential of the capacitor responsive to the accumulated charge to obtain a differential measurement between the first signal and the second signal from a single voltage potential measurement; and
determining a position of an object relative to the first electrode track and the second electrode track of the self-capacitance touch sensor based on the measured voltage potential.

2. The method of claim 1, wherein outputting the first current comprises:
outputting, by an amplifier of the first circuit, an intermediate current having the second polarity; and
outputting, by polarity-switching circuitry of the first circuit, the first current in response to the intermediate current.

3. The method of claim 1, wherein measuring the voltage potential of the capacitor comprises sampling the voltage potential with an analog to digital converter.

4. The method of claim 1, wherein:
the same terminal of the capacitor is always electrically connected to the first output and the second output.

5. The method of claim 1, wherein:
the capacitor is a first capacitor and the third circuit includes a second capacitor electrically connected between the second output and the reference voltage potential node.

6. The method of claim 5, wherein electrically connecting the first output and the second output to the same terminal of the capacitor comprises selectively directly electrically connecting the first output to the second output using a switch of the third circuit, the switch electrically connected between the first output and the second output.

7. The method of claim 1, wherein a magnitude of the first current is proportional to a magnitude of the first signal and a magnitude of the second current is proportional to a magnitude of the second signal.

8. An apparatus comprising:
a first circuit electrically connected to a first electrode track of a self-capacitance touch sensor, the first circuit configured to output to a first output of the first circuit a first current having a first polarity responsive to a first signal from the first electrode track;
a second circuit electrically connected to a second electrode track of the self-capacitance touch sensor, the second circuit configured to output to a second output of the second circuit a second current having a second polarity opposite to the first polarity responsive to a second signal from the second electrode track, the second signal having a same polarity to that of the first signal;
a third circuit configured to electrically connect the first output and the second output to a same terminal of a capacitor of the third circuit, the capacitor electrically connected between the first output and a reference voltage potential node, the capacitor configured to accumulate charge responsive to the first current and the second current; and
a sensor configured to:
measure a voltage potential at the capacitor responsive to the accumulated charge to obtain a differential measurement between the first signal and the second signal from a single voltage potential measurement; and
determine a position of an object relative to the first electrode track and the second electrode track based on the measured voltage potential.

9. The apparatus of claim 8, wherein the sensor comprises an analog to digital converter.

10. The apparatus of claim 8, wherein the first circuit comprises:
an amplifier configured to output an intermediate current having the second polarity; and
a polarity-switching circuit configured to output the first current in response to the intermediate current.

11. The apparatus of claim 8, wherein the same terminal of the capacitor is always electrically connected to the first output and the second output.

12. The apparatus of claim 8, wherein:
the capacitor is a first capacitor; and
the third circuit includes a second capacitor electrically connected between the second output and the reference voltage potential node.

13. The apparatus of claim 12, wherein the third circuit further comprises a switch electrically connected between the first output and the second output.

14. An apparatus comprising:
a first circuit electrically connected to a first electrode track of a self-capacitance touch sensor, the first circuit including a first output, the first output configured to output a first current responsive to a first signal from the first electrode track, the first current having a first polarity;
a second circuit electrically connected to a second electrode track of the self-capacitance touch sensor, the second circuit including a second output, the second output configured to output a second current responsive to a second signal from the second electrode track, the second signal having a same polarity to that of the first signal, the second current having a second polarity opposite to the first polarity;

a third circuit configured to electrically connect the first output and the second output to a same terminal of a capacitor of the third circuit, the capacitor electrically connected between the first output and a reference voltage potential node; and a sensor configured to:
  measure a single electrical quantity at the capacitor, the single electrical quantity proportional to a difference between the first current and the second current; and
  determine a position of an object relative to the first electrode track and the second electrode track based on the single electrical quantity.

15. The apparatus of claim 14, wherein the single electrical quantity is a voltage potential associated with the third circuit.

16. The apparatus of claim 14, wherein the single electrical quantity is a current associated with the third circuit.

17. The apparatus of claim 14, wherein the first circuit comprises:
  an amplifier configured to output an intermediate current having the second polarity; and
  a polarity-switching circuit configured to output the first current in response to the intermediate current.

18. The apparatus of claim 14, wherein the sensor comprises an analog to digital converter configured to sample the single electrical quantity.

19. The apparatus of claim 14, wherein:
  the capacitor is a first capacitor; and
  the third circuit includes a second capacitor connected between the second output and the reference voltage potential node.

* * * * *

UNITED STATES PATENT AND TRADEMARK OFFICE
CERTIFICATE OF CORRECTION

PATENT NO. : 10,955,973 B2
APPLICATION NO. : 13/864058
DATED : March 23, 2021
INVENTOR(S) : Gregory Brillant, Steinar Myren and Terje Saether It is certified that error appears in the above-identified patent and that said Letters Patent is hereby corrected as shown below:

In the Specification

| | | |
|---|---|---|
| Column 11, | Line 65, | change "time to." to --time t0.-- |
| Column 12, | Line 3, | change "time to." to --time t0.-- |
| Column 13, | Line 44, | in the equation, "A ∗ V ∗" should read --A* V*-- and change both "ext" to --*ext*-- |
| Column 13, | Line 53, | in the equation, "A ∗ V ∗" should read --A* V*-- |

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*